(12) United States Patent
Liu

(10) Patent No.: US 12,109,615 B2
(45) Date of Patent: Oct. 8, 2024

(54) SYSTEM AND METHOD FOR MAGNETOHYDRODYNAMIC (MHD) PRINTHEAD/NOZZLE

(71) Applicant: Additive Technologies, LLC, Palm City, FL (US)

(72) Inventor: Chu-heng Liu, Penfield, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 164 days.

(21) Appl. No.: 17/851,551

(22) Filed: Jun. 28, 2022

(65) Prior Publication Data

US 2022/0324031 A1 Oct. 13, 2022

Related U.S. Application Data

(63) Continuation-in-part of application No. 17/131,402, filed on Dec. 22, 2020, now Pat. No. 11,400,714.

(51) Int. Cl.
*B22F 12/55* (2021.01)
*B22D 23/00* (2006.01)
*B22F 10/22* (2021.01)
*B33Y 10/00* (2015.01)
*B33Y 30/00* (2015.01)
*B33Y 40/00* (2020.01)

(52) U.S. Cl.
CPC ............ *B22F 12/55* (2021.01); *B22D 23/003* (2013.01); *B22F 10/22* (2021.01); *B33Y 10/00* (2014.12); *B33Y 30/00* (2014.12); *B33Y 40/00* (2014.12)

(58) Field of Classification Search
CPC ......... B22F 12/55; B33Y 30/00; B33Y 40/00; B33F 10/22; B22D 23/003
See application file for complete search history.

(56) References Cited

U.S. PATENT DOCUMENTS

2017/0365484 A1   12/2017   Kotler et al.
2018/0304370 A1   10/2018   Myerberg et al.
2019/0001410 A1*  1/2019    Ho ..................... B33Y 10/00

OTHER PUBLICATIONS

Sukhotskiy et al., "Magnetohydrodynamic Drop-on-Demand Liquid Metal 3D Printing," Solid Freeform Fabrication 2017: Proceedings of the 28th Annual International, Solid Freeform Fabrication Symposium—An Additive Manufacturing Conference, 1806-1811.

* cited by examiner

*Primary Examiner* — Jason S Uhlenhake
(74) *Attorney, Agent, or Firm* — MH2 TECHNOLOGY LAW GROUP, LLP

(57) ABSTRACT

A method for operating a printer can include placing a first print material into a supply reservoir of the printer. The method also includes placing a second print material into the supply reservoir to combine with the first print material to form a diluted print material. The method also includes causing the diluted print material to exit the supply reservoir. Another method for operating a printer includes adding a first print material having a first melting point to a supply reservoir at a first rate. The method also includes adding a second print material having a second melting point to a supply reservoir at a second rate. The method for operating a printer also includes allowing the first print material and the second print material to combine to form a diluted print material. A printing system is also disclosed.

31 Claims, 7 Drawing Sheets

SYSTEM AND METHOD FOR MAGNETOHYDRODYNAMIC (MHD) PRINTHEAD/NOZZLE

CROSS-REFERENCE TO RELATED APPLICATIONS

This application is a continuation-in-part application of U.S. patent application Ser. No. 17/131,402 filed on Dec. 22, 2020 which is hereby incorporated by reference in its entirety.

TECHNICAL FIELD

The present teachings relate to the field of printing, such as three dimensional printing, functional printing, and other printing and, more particularly, to methods and structures for printing high melting point temperature materials such as metals and metal alloys.

BACKGROUND

Drop-on-demand (DOD) printers that are capable of jetting or ejecting high temperature materials such as a metal are being developed and improved. One type of printer employs magnetohydrodynamic (MHD) technology to manipulate an electrically conductive print fluid or print material such as liquid metal print material, for example molten aluminum, using a magnetic field to eject a single drop or volume of the print material from a nozzle. During a metal printing process, metal in a solid form can be supplied from a wire spool to a supply reservoir of the printer. The solid metal is heated within the supply reservoir to a temperature sufficient to melt the solid metal and to maintain a level of liquid metal within the supply reservoir. When the level of liquid metal within the supply reservoir is sufficient, the liquid metal is passed from the supply reservoir through a channel to the nozzle, and printing can be initiated. The liquid metal that is ejected from the nozzle onto a surface is replaced so that a desired level or volume of liquid metal is maintained within the supply reservoir. Thus printing of liquid metal can be continuous.

To prepare a metal printer for storage or other periods of nonuse after printing, the molten metal print fluid can be drained through the nozzle then the printer can cooled. Draining the print fluid prior to cooling the printer reduces problems associated with thermal mismatch between the print material and various printer structures.

A method for use with a printer that prints a high-temperature print fluid such as a liquid metal that reduces damage to printer structures would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for operating a printer is disclosed. The method for operating a printer includes placing a first print material into a supply reservoir of the printer. The method also includes placing a second print material into the supply reservoir to combine with the first print material to form a diluted print material. The method also includes causing the diluted print material to exit the supply reservoir.

Implementations of the method for operating a printer include where an inner surface of the supply reservoir is continuously wetted by the first print material, the second print material, or a combination thereof. The diluted print material exits the supply reservoir via a nozzle in communication with the supply reservoir. Causing the diluted print material to exit the supply reservoir further may include ejecting the diluted print material from a nozzle. The method for operating a printer may include agitating the supply reservoir. Agitating the supply reservoir may include subjecting the diluted print material to a non-firing pulse. The diluted print material exits the supply reservoir via a drain outlet in communication with the supply reservoir. The method for operating a printer may include printing a 3D article with the first print material prior to placing the second print material into the supply reservoir. The method for operating a printer may include printing a 3D article with the diluted print material subsequent to placing the second print material into the supply reservoir. The method for operating a printer may include placing the second print material into the supply reservoir until a content of the diluted print material is greater than 95 percent by weight based on a total weight of the diluted print material. The method for operating a printer may include printing a 3D article with the diluted print material after a content of the diluted print material is greater than 95 percent by weight based on a total weight of the diluted print material. The first print material has a first melting point, the second print material has a second melting point, and the diluted print material has a third melting point. The method for operating a printer may include maintaining a temperature in the supply reservoir that is greater than the first melting point. The method for operating a printer may include maintaining a temperature in the supply reservoir that is greater than the second melting point. The method for operating a printer may include maintaining a temperature in the supply reservoir that is greater than the third melting point. The first print material may include aluminum. The second print material may include copper. The third print material may include at least one component of the first printing material and at least one component of the second print material. The method for operating a printer may include placing a fourth printing material into the supply reservoir after placing the third print material into the supply reservoir. The method for operating a printer may include removing 95% of an initial quantity of the first print material prior to placing the second print material into the supply reservoir.

Another method for operating a printer is disclosed. The method for operating a printer includes adding a first print material having a first melting point to a supply reservoir at a first rate. The method also includes adding a second print material having a second melting point to a supply reservoir at a second rate. The method for operating a printer also includes allowing the first print material and the second print material to combine to form a diluted print material.

Implementations of the method for operating a printer include where a temperature of the supply reservoir is greater than the first melting point and the second melting point, or the first rate is not the same as the second rate. The method for operating a printer may include printing a 3D article with the diluted print material. The diluted print material may include from about 5% wt to about 95% wt of the first print material based on a total weight of the diluted print material. The diluted print material may include from about 5% wt to about 95% wt of the second print material based on a total weight of the diluted print material.

A printing system is disclosed. The printing system includes an ejector for jetting a print material, which includes a supply reservoir, a first print material feed system configured to provide a first print material into the supply reservoir at a first controlled rate, a second print material feed system configured to provide a second print material into the supply reservoir at a second controlled rate, and a nozzle in connection with the supply reservoir and configured to eject one or more drops of liquid print material, where the system also includes where the first print material and the second print material combine to form a diluted print material.

Implementations of the printing system include where the one or more drops of liquid print material may include the diluted print material, the first print material has a first melting point, the second print material has a second melting point, and the diluted print material has a third melting point. The first print material may include aluminum.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
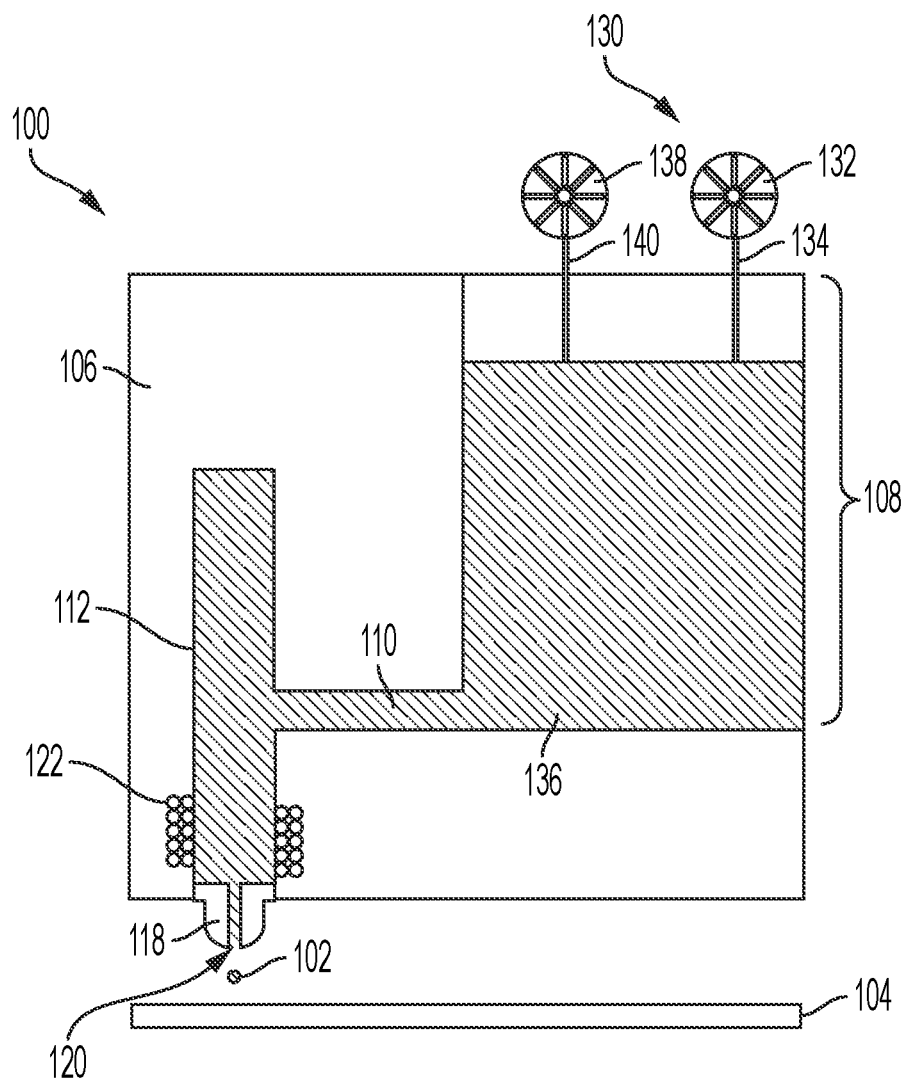
FIG. 1 is a schematic cross section of a printer with a reservoir of the printer according to an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As used herein, unless otherwise specified, the word "printer" encompasses any apparatus that performs a print outputting function for any purpose. Further, as used herein, the term "sacrificial" metal refers to a material that is used during a printer shutdown process but is not used in any significant amount to form a printed three-dimensional (3D) structure. As described below, while some of the sacrificial metal may remain in the print material when printing is resumed, the amount of sacrificial metal in the print material is small (i.e., ≤1% by volume) and does not appreciably affect the physical properties of the print material. Furthermore, some of the print material may be mixed with the sacrificial material as the sacrificial material is introduced into the reservoir after a printing process.

As discussed above, a metal printer can employ magnetohydrodynamic (MHD) technology to eject droplets of a print material such as a liquid metal from a nozzle to form a printed metal structure. After printing, the printer can be prepared for storage or other periods of nonuse by draining the print material then cooling the printer to room temperature. Because the metal used as the print material typically has a different coefficient of thermal expansion (TCE) than the structures that form the printer, draining the print fluid prior to cooling the printer reduces problems such as cracking of various printer structures resulting from a thermal mismatch between the printer and the print material. While a thin film or coating of the print material can remain on the inside structures after draining due to adhesive forces of the print material, a block that defines the supply reservoir and channels within the printer is robust and resistant to damage from the thermal mismatch of the block with the print material for this thin film. However, the nozzle from which the print material is ejected during printing is typically manufactured from a frangible material such as a ceramic or a ceramic composite, and damage to the nozzle is common. Furthermore, the print material is difficult to completely remove from the orifice of the nozzle from which the print material is jetted during printing, and thermal mismatch of the nozzle with the remaining print material can result in cracking of the nozzle during cooling of the printer. As such, the nozzle is typically replaced after a one-time use, for example, after one print session. The replacement of the nozzle requires disassembly of the printer by an operator, and the printer is out of service while the nozzle is replaced. Thus the replacement of the nozzle as a matter of course is time consuming and expensive.

Also contributing greatly to the nozzle damage is the relatively large difference between the freezing point/melting point of the print material and the temperature at which the printer is stored. (It will be appreciated that, for purposes of simplicity, the freezing point and melting point of a material as described herein are considered to be the same temperature.) As an example, aluminum used as a print material can have a freezing point of 660° C. (1220° F.), and the printer is typically stored at room temperature (i.e., as used herein, from about 20° C. to about 22° C., or about 68° F. to about 72° F.). During use, the print material is heated to above its melting point. After the print material is drained from the printer, a thin coating of the liquid print material remains on the surfaces of the printer. As the remaining print material cools and solidifies, the print material begins to apply physical stress/strain to the printer structures that it physically contacts, including the walls of the printer and the nozzle, which continues to build or increase until the print material reaches the storage temperature. In this example, the temperature difference between the freezing point of the print material and the printer storage temperature is 638° C. (1180° F.). Other possible print materials such as copper, iron, and titanium have even higher melting points resulting in an even greater temperature difference between the melting point of the print material and the storage temperature of the printer, and thus will apply even greater stresses/strains to the printer.

An implementation of the present teachings includes a method for operating and/or shutting down a metal printer that reduces, prevents, or otherwise mitigates physical damage to the nozzle so that routine replacement of the nozzle during or after a printer shutdown becomes less frequent or unnecessary.

FIG. 1 is a schematic cross section of a printer 100 such as a metal printer that uses magnetohydrodynamic (MHD) technology to eject metal droplets 102 in liquid (i.e., molten) form onto a surface 104 during a printing process. Use of various aspects and structures according to the present teachings with other ejection technologies is contemplated. Further, it will be appreciated that the figures depict generalized example schematic illustrations, and an actual printer in accordance with the present teachings can include other structures that are not depicted for simplicity, while various depicted structures can be removed or modified.

The printer 100 of FIG. 1 includes a block 106 that defines a reservoir 108, a supply inlet 110, and an ejection chamber 112. While the block 106 is depicted as a single structure, it will be appreciated that the block 106 can include two or more sections that are attached together. The block 106 can be or include, for example, boron nitride, graphite, glass, ceramics, or a metal (e.g., tungsten) or a metal alloy that has a higher melting point than the metal used as the print material. The printer 100 further includes a nozzle 118, such as a replaceable nozzle 118. The nozzle 118 includes and/or defines an orifice 120 from which the metal droplets 102 are ejected during printing. The printer 100 further includes an ejector 122 that is electrically engaged (or, depending on the ejection mechanism, mechanically or otherwise engaged) to eject the metal droplets 102 from the orifice 120 of the nozzle 118. The ejector 122 can be, for example, an electromagnetic coil 122 that encircles the ejection chamber 112, or another type of ejector 122.

FIG. 1 further depicts a metal supply 130 which, in this implementation, is a supply reel 132 that supplies a metal wire 134 in solid form to the reservoir 108. The metal wire 134 is melted within the reservoir 108 and becomes a print material 136 (i.e., a print fluid) in the form of liquid (i.e., molten) metal. The print material 136 flows from the reservoir 108, through the supply inlet 110, into the ejection chamber 112 and to the nozzle 118. Printers including other flow paths for the print material 136 are contemplated. The metal wire 134 can be or include a solid aluminum wire or another solid metal or metal alloy, and the print material 136 can be or include a molten aluminum or another molten metal or metal alloy or other material as described herein. Further depicted is a second supply reel 138 that supplies a second metal wire 140 in solid form to the reservoir 108. This second metal wire 140 is also melted within the reservoir 108 and becomes a second print material (i.e., a print fluid) in the form of liquid (i.e., molten) metal. This second print material is not shown in this view. The second print material can also flow from the reservoir 108, through the supply inlet 110, into the ejection chamber 112 and to the nozzle 118. Printers including other flow paths for the second print material are also contemplated. The second metal wire 140 can be or include a solid aluminum wire or another solid metal or metal alloy or other material as described herein.

To eject a metal droplet 102 from the orifice 120 of the nozzle 118, an electric current is applied to the coil 122 which develops a pulsed magnetic field through the coil 122. This pulsed magnetic field induces an MHD-based force density within the print material 136 within the ejection chamber 112, which overcomes capillarity and/or surface tension of the print material 136 within the orifice 120 of the nozzle 118, thereby ejecting the metal droplet 102 from the orifice 120. It will be appreciated that contours of the reservoir 108, the supply inlet 110 and/or the ejection chamber 112 can be designed to improve, customize, and/or optimize flow dynamics of the print material 136 therewithin. The reservoir 108, the supply inlet 110, the ejection chamber 112, the nozzle 118, and the orifice 120 are in fluid communication, each with the other.

An implementation of the present teachings can include a printer shutdown process. The printer shutdown process can be implemented, for example, to prepare the printer for storage, maintenance, repair, or another purpose.

Figure 2:
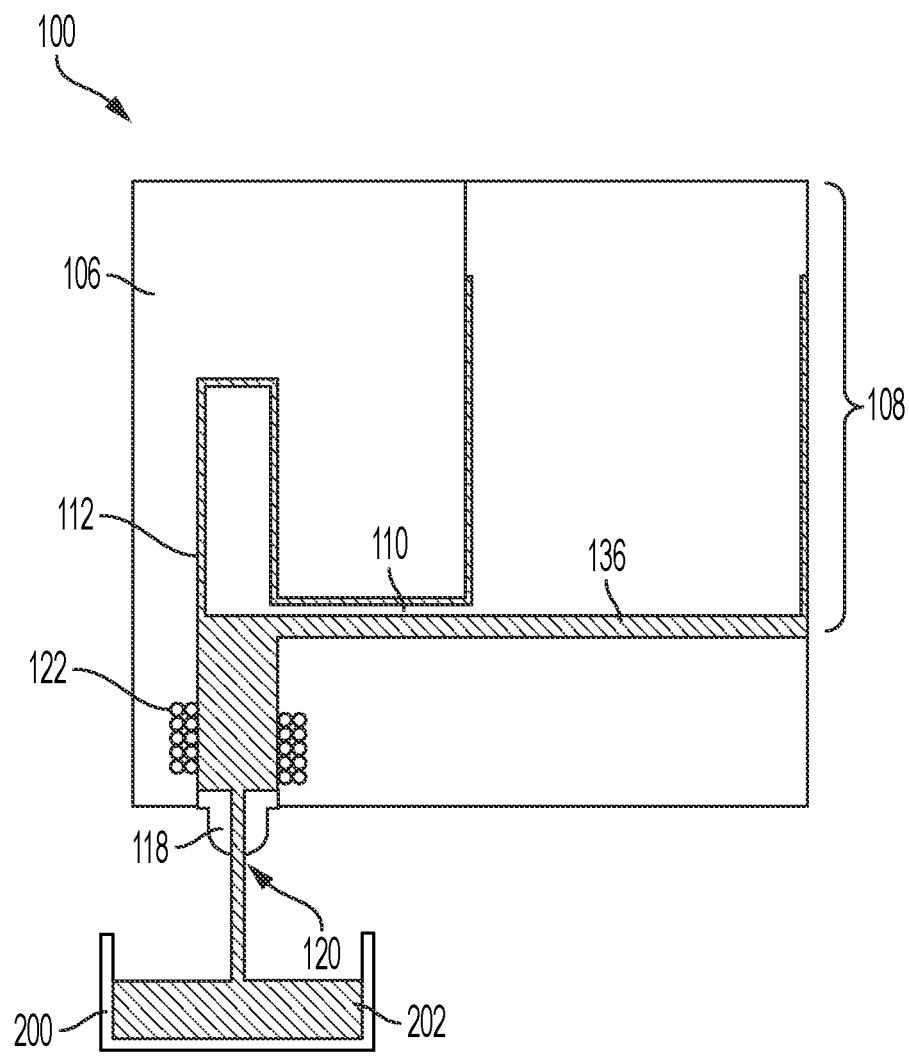
FIG. 2 depicts the printer of FIG. 1 during a draining process that drains the print material from the printer through a nozzle before the printer is cooled for storage.

After the printing process depicted in FIG. 1 has been completed, the print material 136 is drained from the printer as depicted in FIG. 2. The print material 136 can be drained from the printer 100, for example, through the orifice 120 of the nozzle 118, or through another opening, into a collection receptacle 200. The drained print material 202 can be processed for subsequent reuse as a print material 136 or recycled. FIG. 2 depicts the printer 100 during draining of the print material 136, and FIG. 3 depicts the printer 100 subsequent to the print material draining process.

Figure 3:
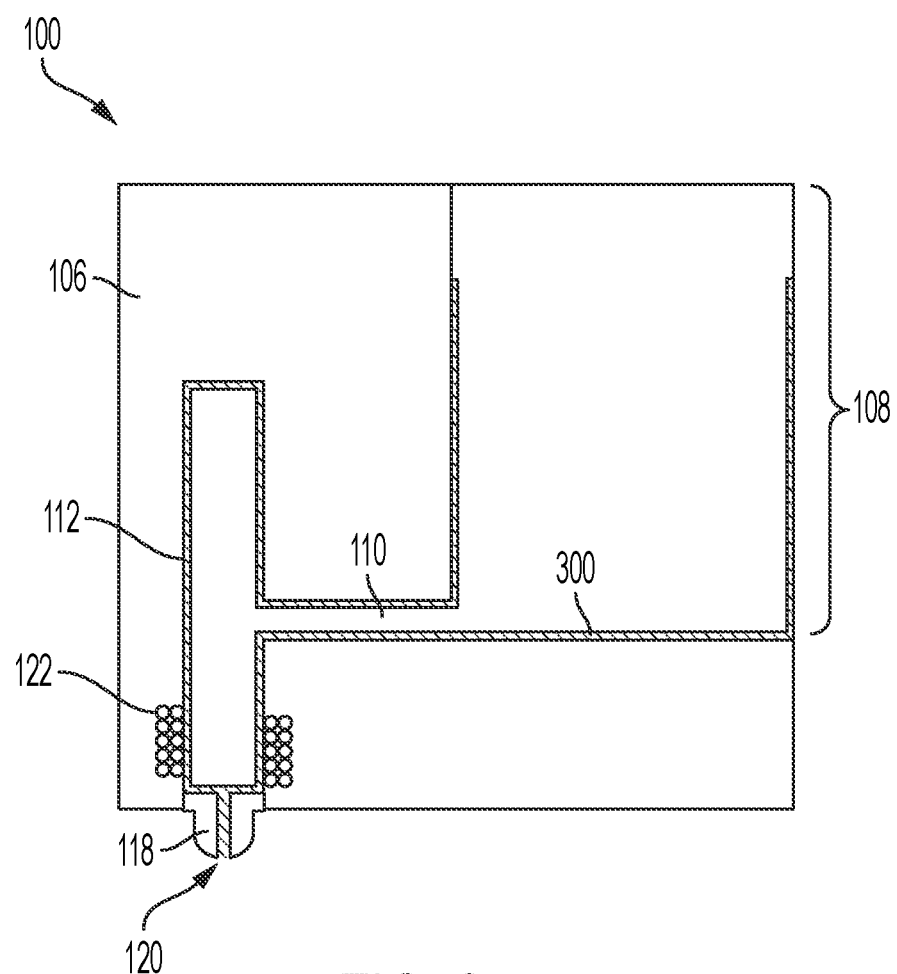
FIG. 3 depicts the printer of FIG. 2 after the print material has been drained from the printer.

After the print material draining process of FIG. 2 has been completed, the printer 100 of FIG. 3 remains. As depicted in FIG. 3, a portion of the print material 136 forms a print material coating 300 over internal surfaces of the printer 100 (e.g., over walls or surfaces of the block 106 that define the reservoir 108, the supply inlet 110, and the ejection chamber 112, and within the nozzle 118 and the orifice 120 of the nozzle 118), at least partly as a result of adhesive forces between the surfaces of the printer 100 and the print material 136. In conventional shutdown processes, the printer 100 depicted in FIG. 3 is cooled, which results in frequent cracking of the nozzle 118 due to, at least in part, stresses and strains placed on the nozzle by the print material 136 as the print material 136 cools below its melting point.

Figure 4:
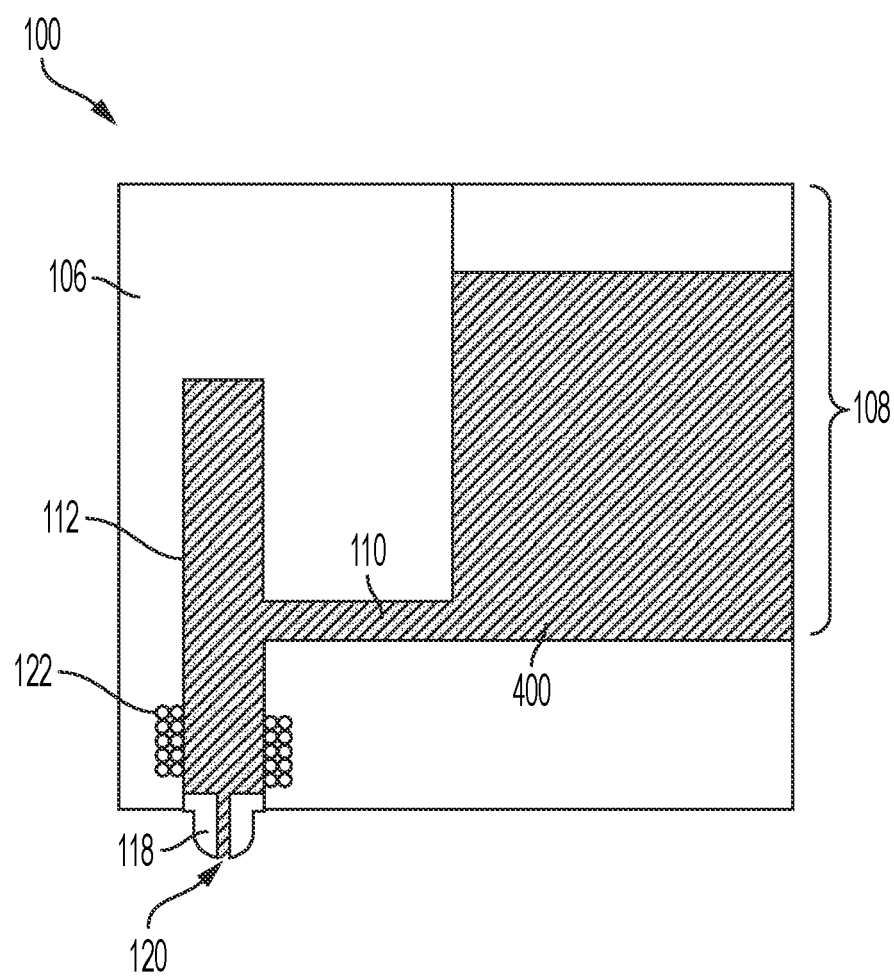
FIG. 4 depicts the printer of FIG. 3 after placing a volume of a sacrificial material into the printer.

In contrast, a shutdown process in accordance with the present teachings further includes at least partially or completely filling the printer 100 of FIG. 3 with a sacrificial metal 400 as depicted in FIG. 4. The sacrificial metal 400 can be a molten metal material that has a lower freezing temperature than the print material. In another aspect, the sacrificial metal 400 can have a TCE that more closely matches the TCE of printer structures that contact the print material, such as the nozzle 118 and the surfaces of the block 106 that define the reservoir 108, the inlet 110, and the ejection chamber 112, than does the TCE of print material 136. In some implementations, the sacrificial metal 400 can be a molten metal material that is miscible in all proportions with the metal that is used as the print material 136 when the sacrificial metal 400 and the print material 136 are in a liquid state. In other words, the sacrificial metal 400 and the print material 136 are completely soluble in one another irrespective of the order of introduction. Additionally, the sacrificial metal 400 can be a molten metal material that is a relatively soft metal when in a solid form.

When aluminum or an aluminum alloy is used as the print material 136, the sacrificial metal 400 can be tin, a tin alloy, lead, a lead alloy, a tin-lead alloy (e.g., solder), or another suitable metal or metal alloy. Tin has the physical properties of being a soft metal in solid form with a much lower melting point than an aluminum print material, and is miscible with aluminum in all proportions when in a liquid state. Further, tin has a freezing point of 232° C. (449° F.), and thus a difference between the freezing point of tin and the 22° C. (72° F.) storage temperature of the printer is 210° C. (410° F.). In contrast, as described above, aluminum as a print material has a freezing point of 660° C. (1220° F.), making the difference between the freezing point of aluminum and the storage temperature 638° C. (1180° F.). Using tin or another material described herein as a sacrificial metal during storage of the printer as described herein thus results in much lower stress/strain on the nozzle than cooling the printer immediately after draining the print material 136.

The sacrificial materials are typically chosen from metals or their alloys that have a low melting point, for example, below about 425° C., or below about 350° C., or below about 300° C., or below about 200° C. For example, by way of example and without limitation to the material listed, some low melting point materials that are contemplated include gallium (30° C.), indium (157° C.), tin (232° C.), bismuth (271° C.), zinc (420° C.), cadmium (321° C.), lead (328° C.), and etc. Depending on the composition, the melting point of metal alloys can be tuned by increasing and decreasing the percentage of each metal or other material. Furthermore, many of these elements or their alloys can mix well with various print materials such as aluminum, copper, iron, titanium and etc. at suitable temperatures. For example, when aluminum or copper is used as the print material, tin can be a good candidate for the sacrificial metal element. Either pure tin, a tin/aluminum alloy with a high percentage of tin, or a tin/copper alloy with high percentage of tin, can provide a sacrificial material having a low melting point that results in reduced thermal stress during cooling of the shutdown process.

As the sacrificial metal 400 is placed into the interior of the printer 100 as depicted in FIG. 4, the sacrificial metal 400 mixes with, and dilutes, the print material 136 that forms the print material coating 300 that remains within the printer 100 subsequent to the draining of the print material 136. A volume of the sacrificial metal 400 is much greater than a volume of the print material coating 300 within the printer 100, and thus the physical properties of the mixture of the two materials (i.e., the material coating 300 and the sacrificial metal 400) are inappreciable from those of the sacrificial metal 400 itself.

Figure 5:
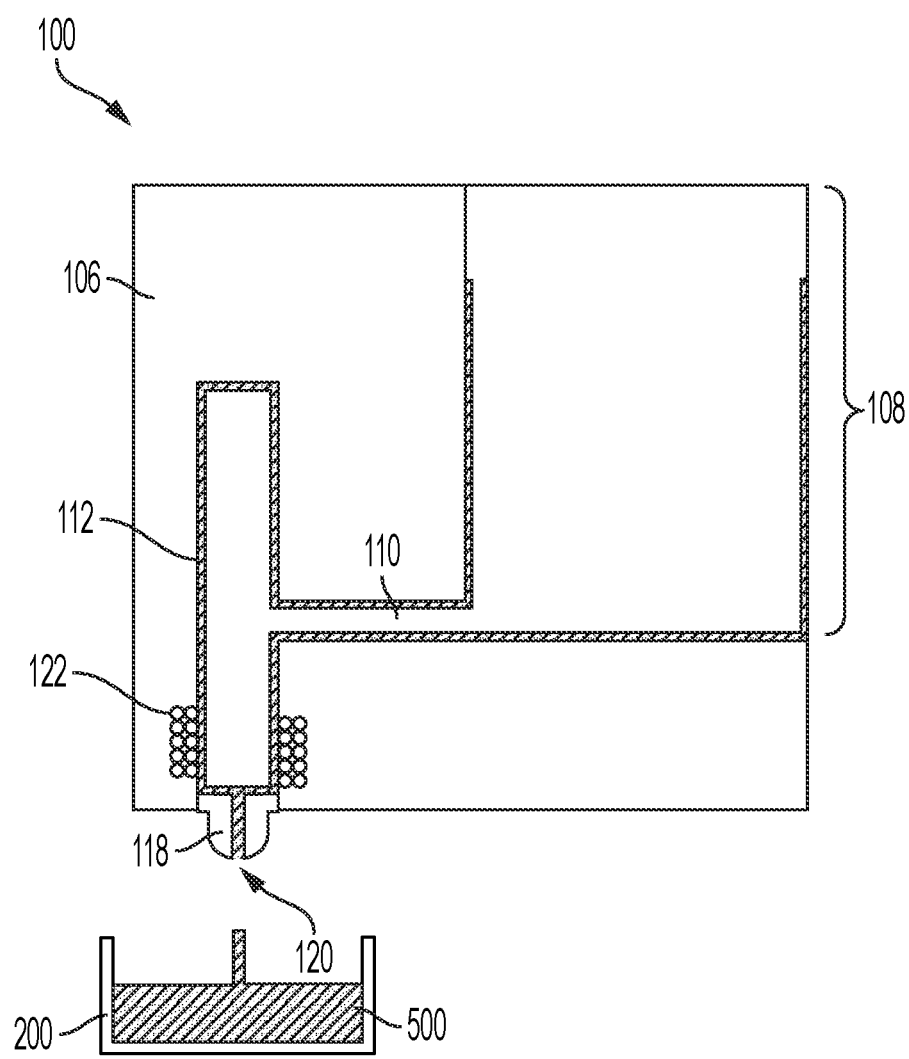
FIG. 5 depicts the printer of FIG. 4 after draining the sacrificial material from the printer through the nozzle, after which the printer can be cooled for storage.

Next, as depicted in FIG. 5, the sacrificial metal 400 is drained from the printer 100, for example, by ejecting the sacrificial metal 400 from the orifice 120 of the nozzle 118. FIG. 5 schematically depicts the printer 100 just as the draining of the sacrificial metal 400 is completed. Draining the sacrificial metal 400 removes almost all of the print material 136 that remains in the printer 100 at FIG. 3. For example, the draining of the sacrificial metal 400 as depicted in FIG. 5 can removed from about 90% to about 100%, or from about 95% to about 100%, or from about 99% to about 100% of the print material 136 that remains in the printer 100 after the FIG. 2 procedure that drains the print material 136 to result in a structure similar to FIG. 3. The drained sacrificial metal 500, which contains a low percentage of the print material 136, can be collected within a collection receptacle 200. Because the drained sacrificial metal 500 includes a very low percentage of the print material 136, the drained sacrificial metal 500 can be reused as the sacrificial metal 400 during one or more subsequent shutdown processes. The percentage of print material 136 within any reused drained sacrificial metal 500 increases with each shutdown process. After the percentage of the print material 136 within the drained sacrificial metal 500 is sufficiently high, the drained sacrificial metal 500 can be processed to remove the print material 136 or recycled.

A range of metal materials and metal alloy materials are suitable for printing, and the print materials can have very different melting points. The print material 136 can be a material that has a first freezing point/melting point of from about 500° C. to about 3000° C., or from about 600° C. to about 2500° C. The sacrificial metal 400 can be a material that has a second freezing point/melting point of from about 220° C. to about 400° C., or from about 230° C. to about 350° C., or from about 220° C. to about 320° C., or below about 300° C., or below about 200° C. The difference in the freezing point/melting point of the print material 136 and the sacrificial metal 400 can be from about 200° C. to about 2000° C., or from about 350° C. to about 1800° C., or from about 500° C. to about 1600° C.

Figure 6:
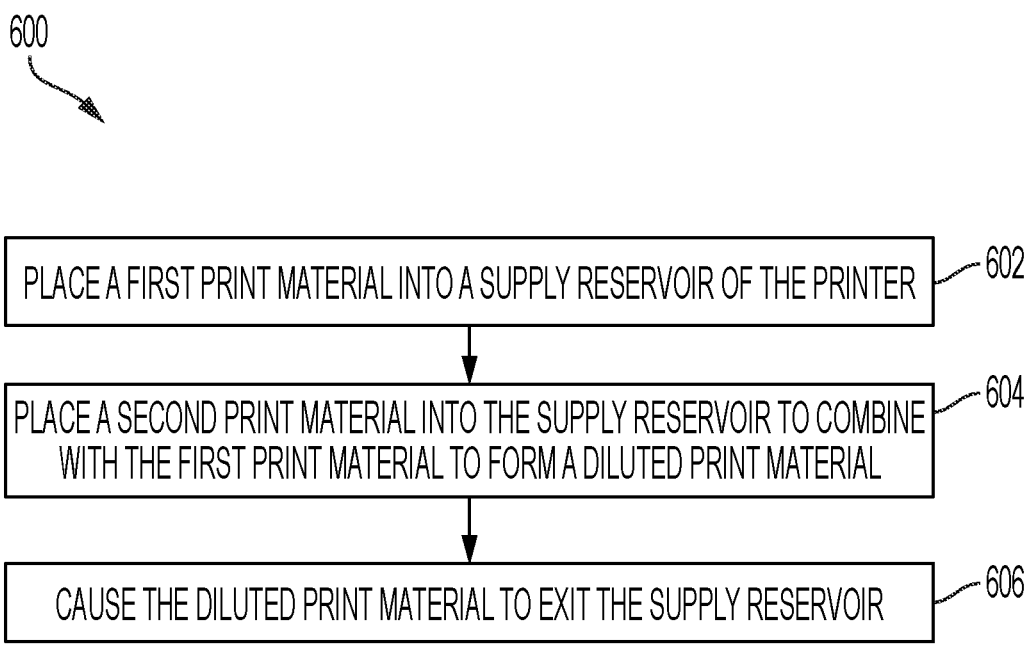
FIG. 6 is a flow chart depicting a printer operation process according to an implementation of the present teachings.

FIG. 6 is a flow chart of a method 600 for operating a printer, where the method 600 is or includes a dilution process. For simplicity of explanation, and without limiting the present teachings, the method 600 of FIG. 6 is described with reference to the structures depicted in FIGS. 1-5, although it is contemplated other implementations can include structures and method acts that are not depicted for simplicity, while various depicted structures and method acts may be removed or modified.

The method 600 can include placing a first print material into a supply reservoir as at 602. After the first print material is placed into a supply reservoir a second print material is placed into the supply reservoir to combine with the first print material to form a diluted print material as at 604. The print material 136 can be or include a metal such as aluminum or another suitable print material. The diluted print material can be caused to exit the supply reservoir 606 as will be described later herein.

Figure 7:
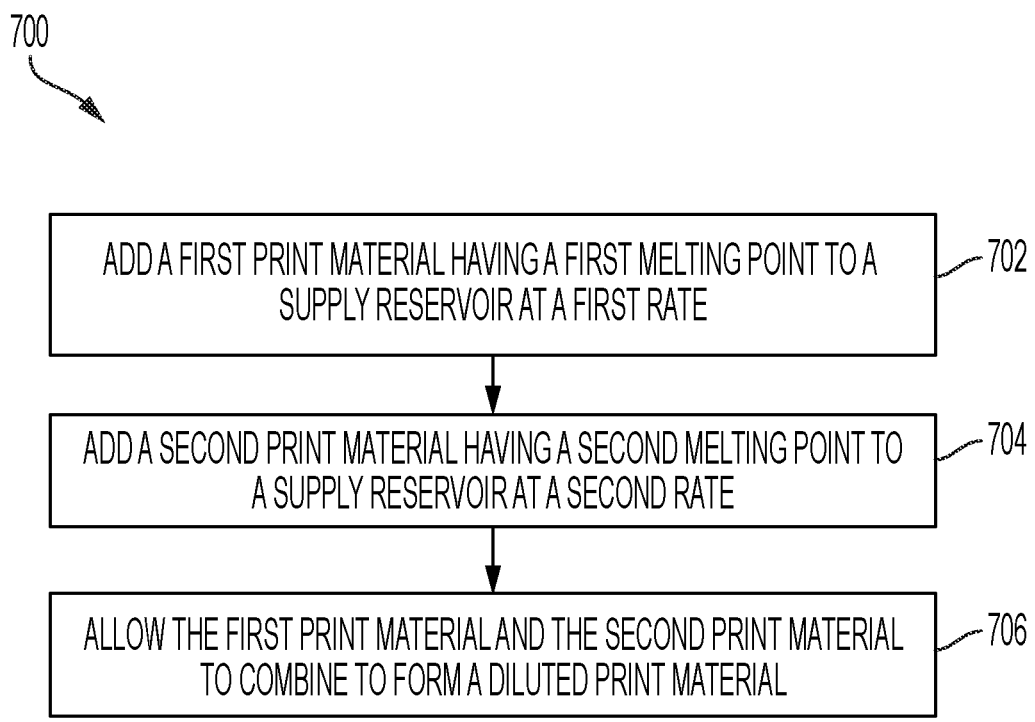
FIG. 7 is a flow chart depicting a printer operation process according to an implementation of the present teachings.

FIG. 7 is a flow chart of a method 700 for operating a printer, where the method 700 is or includes a dilution process. For simplicity of explanation, and without limiting the present teachings, the method 700 of FIG. 7 is described with reference to the structures depicted in FIGS. 1-5, although it is contemplated other implementations can include structures and method acts that are not depicted for simplicity, while various depicted structures and method acts may be removed or modified.

The method 700 can include adding a first print material having a first melting point to a supply reservoir at a first rate as at 702. After the first print material is added into a supply reservoir a second print material is added, having a second melting point to a supply reservoir at a second rate as at 704. Next the method 700 includes allowing the first print material and the second print material to combine to form a diluted print material as at 706.

The method 700 can include wherein a temperature of the supply reservoir is greater than the first melting point and the second melting point, or wherein the first rate is not the same as the second rate. The method 700 can include printing a 3D article with the diluted print material. In certain examples, the method 700 includes wherein the diluted print material is composed of from about 5% wt to about 95% wt of the first print material based on a total weight of the diluted print material, or alternatively wherein the diluted print material includes from about 5% wt to about 95% wt of the second print material based on a total weight of the diluted print material.

An implementation of the present teachings thus mitigates problems associated with differences in TCE's of the structures of the printer 100 and the print material 136 during a shutdown or cooling of the printer 100. Because the freezing temperature of the sacrificial metal 400 is much lower than the freezing point of the print material 136, the stress/strain applied to the structures of the printer 100, particularly the nozzle 118, during shutdown or cooling of the printer 100 is decreased. In contrast to some shutdown procedures that include routine replacement of the nozzle as a matter of course after each shutdown of the printer as a result of nozzle cracking, the shutdown procedure described herein decreases the frequency of, or eliminates, cracking of the nozzle during the cooling and/or shutdown procedure.

Implementations of the present disclosure provide, during the operation a MHD printer head, methods and systems for changing of liquid metal or alloy within in the printer head. For example, during a startup of a fresh nozzle, a preferred material other than the build material or first print material can be used for a "break-in" process. In this "break-in" process, the initial wetting of the inner surface of the nozzle is one of the important functions of this break-in composition. During a shut-down sequence, a material that will exert less mechanical stress on the nozzle can be used, such as the sacrificial metals described previously herein. During a longer printing process, the material in the nozzle or the nozzle inner surface can degrade. In this situation, a maintenance material can be used to treat the nozzle and recover the performance. During the long life of the print nozzle, there can be other operating conditions or events where changing or switching print materials can be advantageous. The print materials can vary significantly in composition, properties such as melting point and others. Examples of print material compositions can include previously described print or build materials or sacrificial metals, which in these situations, may be used as print or build materials. These can include, but are not limited to, for example, aluminum based alloys or copper based alloys. In still other situations, the composition of the build material can be continuously tuned, such as in a functionally gradient material (FGM).

Replacing one material with another can be as direct as removing the first material completely followed by loading the second material. In practice, however, with liquid metal and the associated jetting printer head, this can prove challenging. The wetting force of adhesion between the liquid metal and the inner surface of the nozzle can be high and the dimensions of the nozzle can be small, on the order of about 100 µm to about 1000 µm. Methods of removal such as draining, jetting, vacuum from the front or rear of the jetting head, and the like can leave small amounts or remnants of material to firmly adhere to the inner surface of the print head. As such, a stepwise complete replacement of one print material for another print material can be challenging.

In other examples, the wetting of the liquid metal on the nozzle inner surface as well as some other parts of the reservoir can be critical for jetting operations. This wetting allows the liquid metal to flow naturally, without any additional pressure pulses to the nozzle opening. Nozzles made from ceramic materials or other high temperature non-metallic materials such as graphite, having wetting properties such that the wetting typically takes additional time to establish, for example, from a few minutes to a few hours. If a complete removal is used, a re-wetting process is required to re-establish the wetting condition for a second material. Therefore, once the wetting condition is established for the first material, maintaining this wetting condition throughout the material replacement process can be advantageous.

Methods of the present disclosure provide a gradual and continuous change through the dilution of the first material during the continuous running of the second material rather than a composition change in a stepwise fashion, as in a complete removal and reload. Furthermore, during this dilution process, the wetting condition of the liquid metal on the nozzle inner surface can be maintained. During the dilution replacement process, the composition may not be completely uniform, or homogeneous, across the supply reservoir. At different regions inside the nozzle, materials have the possibility of being diluted at different rates. For example, the bulk material as well as the jetted drops can be diluted faster than the materials that adhere to the inner surface of the nozzle. Depending on the functional requirements, longer time and larger amount of total throughput can be used to achieve a more complete replacement of a second material for a first material.

As the dilution process can be driven by the draining and subsequent printing of the second material, the MHD print head must remain functional and operational during the dilution process. Most material in the reservoir should remain in a liquid phase as well, and as such the temperature should be sufficiently higher than the liquidous temperature of the mixture throughout the dilution process. There can be situations wherein the two print materials are in-compatible, in which case the two materials cannot be directly replaced through dilution for chemical or physical reasons. In such an instance, an intermediate or third print material that is compatible with both the first print material and second print material can be used to facilitate the materials replacement. In some examples, a series of multiple intermediate print materials can also be used. For example, if transitioning from an aluminum alloy such as Al-7075 to pure copper, the temperature increase can be too high, and such a sudden temperature increase can cause some alloying elements, for example, magnesium, in the Al-7075 to evaporate too quickly. In this situation, for example, one or more alloys of aluminum and copper can be used as intermediate material(s). Regardless, in most examples, a faster switching would be employed. A typical process could begin with removing the first print material either by draining from a drain outlet in communication with the supply reservoir or through a backend removal, i.e., suction, leaving only a small amount of the first print material adhering to the inner surfaces or other hard to reach locations within the ejector head. Next, the dilution process can proceed with feeding the second print material into the reservoir. This process will continue with the mixing and removal. In another example, removal is accomplished by draining or ejecting or printing through the front of the nozzle. In addition, to enhance the speed of a dilution or replacement process and reduce the amount of a second print material used in the process, some agitation methods can be used, such as non-firing pulses.

Implementations of the method for operating a printer include placing a first print material into a supply reservoir of the printer, placing a second print material into the supply reservoir to combine with the first print material to form a diluted print material, and causing the diluted print material to exit the supply reservoir. In examples, an inner surface of the supply reservoir is continuously wetted by the first print material, the second print material, or a combination thereof. The diluted print material can exit the supply reservoir via a nozzle in communication with the supply reservoir, or via a drain outlet in communication with the supply reservoir. Before, during or after the dilution process, a 3D article or part of a 3D article can be printed with the first print material prior to placing the second print material into the supply reservoir, or a 3D article or part of a 3D article can be printed with the diluted print material subsequent to placing the second print material into the supply reservoir. The second print material can be added into the supply reservoir until a content of the diluted print material is greater than 95 percent by weight based on a total weight of the diluted print material. In other examples, a 3D article can be printed with the diluted print material after a content of the diluted print material is greater than 95 percent by weight based on a total weight of the diluted print material. Throughout the dilution process a temperature in the supply reservoir is maintained that is greater than the first melting point of the first print material, and in some examples, greater than the second melting point of the second print material. In cases where an intermediate material is used, or a third print material, the temperature in the supply reservoir is greater than the third melting point. When a third, intermediate print material is used, the third print material is placed into the supply reservoir prior to placing the second print material into the supply reservoir, and the third print material includes at least one component of the first printing material and at least one component of the second print material. Implementations include removing approximately 95% of an initial quantity of the first print material prior to placing the second print material into the supply reservoir.

While the replacement of print materials through dilution in a rapid and efficient manner within a liquid metal jetting head has been described, it can be an alternate example of the present disclosure to provide one or more functionally gradient materials (FGM), where the dilution rate needs to be well-controlled. Functionally gradient materials are composite materials in which final properties, such as physical properties, melting properties, chemical properties, corrosive properties, among others, vary gradually within the final dimensions of a part or article produced with such a material. The present disclosure further provides the maintenance of a more homogeneous composition across the supply reservoir within the liquid metal jetting head. One manner of achieving a controlled composition in an FGM is by providing a specified rate control through two or more print material supplies. For example, two independent supplies at two extremes of the composition can be incorporated into a printing system of the present disclosure. By adjusting the feed rates of the supplies while considering the volume of the supply reservoir, any compositions between the two extremes can be predictably provided. To maintain a homogeneous composition across the reservoir, some agitation such as, but not limited to a non-firing pulse combined with time delay which enhance materials diffusion can be utilized. This method of operating a printer, can include adding a first print material having a first melting point to a supply reservoir at a first rate, adding a second print material having a second melting point to a supply reservoir at a second rate, and allowing the first print material and the second print material to combine to form a diluted print material. This diluted print material can have a range of compositions from 100% of the first print material based on a total weight of the diluted print material to 100% of the second print material based on a total weight of the diluted print material. In an example implementation, a temperature of the supply reservoir is greater than the first melting point of the first print material and the second melting point of the second print material. In an example, the first rate of feeding the first print material can be the same as the second rate of feeding the second print material. In other examples, the first rate and the second rate are not the same. Once the diluted print material, or FGM, is created within the supply reservoir, a 3D article can be printed with the diluted print material. In certain examples, the FGM or diluted print material can be composed of up to 5 different print materials, each print material having an individual feed system, feed rate, melting point, or other property. In some exemplary implementations, the diluted print material comprises from about 5% wt to about 95% wt of the first print material based on a total weight of the diluted print material or can alternatively comprises from about 5% wt to about 95% wt of the second print material based on a total weight of the diluted print material.

An implementation of the present teachings includes a printing system, comprising an ejector for jetting a print material, comprising a supply reservoir, a first print material feed system configured to provide a first print material into the supply reservoir at a first controlled rate a second print material feed system configured to provide a second print material into the supply reservoir at a second controlled rate, and a nozzle in connection with the supply reservoir and configured to eject one or more drops of liquid print material, wherein the first print material and the second material combine to form a diluted print material. The printing system can eject drops of print material composed of the first print material, the second print material, or the one or more drops of liquid print material includes the diluted print material.

Examples of the printing system of the present disclosure include where the first print material has a first melting point, the second print material has a second melting point, and the diluted print material has a third melting point. The materials that is suitable for this liquid metal jetting system can include a wide range of metals and their alloys. For example, Aluminum, Copper, Iron, Titanium, Nickel, Chromium, Tin, Tungsten and etc. The melting points could range from 300 C to 3000 C and the first material can have either a higher or lower melting point than the second material. The system control will be adapted to the materials dilution process and adjust the temperature accordingly.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for operating a printer, comprising:
   placing a first print material into a supply reservoir of the printer;
   placing a second print material into the supply reservoir to combine with the first print material to form a diluted print material; and
   causing the diluted print material to exit the supply reservoir; and
   wherein the first print material and the second print materials comprise a metal or metal alloy.

2. The method for operating a printer of claim 1, wherein an inner surface of the supply reservoir is continuously wetted by the first print material, the second print material, or a combination thereof.

3. The method for operating a printer of claim 1, wherein the diluted print material exits the supply reservoir via a nozzle in communication with the supply reservoir.

4. The method for operating a printer of claim 3, wherein causing the diluted print material to exit the supply reservoir further comprises ejecting the diluted print material from a nozzle.

5. The method for operating a printer of claim 4, further comprising agitating the supply reservoir.

6. The method for operating a printer of claim 5, wherein agitating the supply reservoir comprises subjecting the diluted print material to a non-firing pulse.

7. The method for operating a printer of claim 1, wherein the diluted print material exits the supply reservoir via a drain outlet in communication with the supply reservoir.

8. The method for operating a printer of claim 1, further comprising printing a 3D article or a first part of a 3D article with the first print material prior to placing the second print material into the supply reservoir.

9. The method for operating a printer of claim 1, further comprising printing a 3D article or a second part of a 3D article with the diluted print material subsequent to placing the second print material into the supply reservoir.

10. The method for operating a printer of claim 1, further comprising placing the second print material into the supply reservoir until a content of the diluted print material is greater than 95 percent by weight based on a total weight of the diluted print material.

11. The method for operating a printer of claim 10, further comprising printing a 3D article or a part of a 3D article with the diluted print material after a content of the diluted print material is greater than 95 percent by weight based on a total weight of the diluted print material.

12. The method for operating a printer of claim 1, wherein:
    the first print material has a first melting point;
    the second print material has a second melting point; and
    the diluted print material has a third melting point.

13. The method for operating a printer of claim 12, further comprising maintaining a temperature in the supply reservoir that is greater than the first melting point.

14. The method for operating a printer of claim 12, further comprising maintaining a temperature in the supply reservoir that is greater than the second melting point.

15. The method for operating a printer of claim 12, further comprising maintaining a temperature in the supply reservoir that is greater than the third melting point.

16. The method for operating a printer of claim 1, wherein the first print material has a higher melting point than the second print material.

17. The method for operating a printer of claim 1, wherein the second print material has a lower melting point than the second print material.

18. The method for operating a printer of claim 1, further comprising placing a third print material into the supply reservoir prior to placing the second print material into the supply reservoir, wherein the third print material comprises at least one component of the first printing material and at least one component of the second print material.

19. The method for operating a printer of claim 18, further comprising placing a fourth printing material into the supply reservoir after placing the third print material into the supply reservoir.

20. The method for operating a printer of claim 1, further comprising removing 95% of an initial quantity of the first print material prior to placing the second print material into the supply reservoir.

21. A method for operating a printer, comprising:
    adding a first print material having a first melting point to a supply reservoir at a first rate;
    adding a second print material having a second melting point to a supply reservoir at a second rate; and
    allowing the first print material and the second print material to combine to form a diluted print material; and
    wherein the first print material and the second print materials comprise a metal or metal alloy.

22. The method for operating a printer of claim 21, wherein a temperature of the supply reservoir is greater than the first melting point and the second melting point.

23. The method for operating a printer of claim 21, wherein the first rate is not the same as the second rate.

24. The method for operating a printer of claim 21, further comprising printing a 3D article with the diluted print material.

25. The method for operating a printer of claim 21, wherein the diluted print material comprises from about 5% wt to about 95% wt of the first print material based on a total weight of the diluted print material.

26. The method for operating a printer of claim 21, wherein the diluted print material comprises from about 5% wt to about 95% wt of the second print material based on a total weight of the diluted print material.

27. A printing system, comprising:
an ejector for jetting a print material, comprising:
a supply reservoir;
a first print material feed system configured to provide a first print material into the supply reservoir at a first controlled rate;
a second print material feed system configured to provide a second print material into the supply reservoir at a second controlled rate; and
a nozzle in connection with the supply reservoir and configured to eject one or more drops of liquid print material; wherein:
the first print material and the second print material combine to form a diluted print material; and
the first print material and the second print materials comprise a metal or metal alloy.

28. The printing system of claim 27, wherein the one or more drops of liquid print material comprises the diluted print material.

29. The printing system of claim 27, wherein:
the first print material has a first melting point;
the second print material has a second melting point; and
the diluted print material has a third melting point.

30. The printing system of claim 27, wherein the first print material has a higher melting point than the second print material.

31. The printing system of claim 27, wherein the second print material has a lower melting point than the second print material.

* * * * *